United States Patent
Doupe et al.

(10) Patent No.: US 9,874,008 B2
(45) Date of Patent: Jan. 23, 2018

(54) NON-METALLIC JOIST HANGER

(71) Applicant: KLEVAKLIP SYSTEMS PTY LTD., Cromer NSW (AU)

(72) Inventors: Greg James Doupe, Cromer (AU); Stephen Ley Sanders, Cromer (AU)

(73) Assignee: KLEVAKLIP SYSTEMS PTY LTD., Cromer NSW (AU)

( * ) Notice: Subject to any disclaimer, the term of this patent is extended or adjusted under 35 U.S.C. 154(b) by 0 days.

(21) Appl. No.: 15/416,440

(22) Filed: Jan. 26, 2017

(65) Prior Publication Data

US 2017/0138039 A1 May 18, 2017

Related U.S. Application Data

(63) Continuation-in-part of application No. 14/790,637, filed on Jul. 2, 2015, now Pat. No. 9,637,911.

(30) Foreign Application Priority Data

Jul. 4, 2014 (AU) ................. 2014902579
Jan. 29, 2016 (AU) ................. 2016200576

(51) Int. Cl.
  *E04B 1/38* (2006.01)
  *E04B 1/41* (2006.01)
  *E04B 1/00* (2006.01)

(52) U.S. Cl.
  CPC ............... *E04B 1/40* (2013.01); *E04B 1/003* (2013.01); *E04B 2001/405* (2013.01); *E04B 2103/04* (2013.01)

(58) Field of Classification Search
  CPC ........ E04B 1/40; E04B 1/003; E04B 2103/04; E04B 2001/405
  See application file for complete search history.

(56) References Cited

U.S. PATENT DOCUMENTS

| | | |
|---|---|---|
| 1,833,043 A | 11/1931 | Sheldon |
| 1,848,085 A | 3/1932 | Eisenschmidt |
| 2,101,317 A | 12/1937 | Lemieux |
| 2,217,055 A | 10/1940 | Jennens |
| 4,160,350 A | 7/1979 | Craib |
| D256,663 S | 9/1980 | Gilb |
| 4,230,416 A | 10/1980 | Gilb |
| 4,964,253 A * | 10/1990 | Loeffler ............ E04B 7/06 403/232.1 |
| 5,359,143 A | 10/1994 | Simon |
| 5,481,844 A | 1/1996 | Kajita |
| D492,889 S | 7/2004 | Craine |
| 6,931,813 B2 | 8/2005 | Collie |
| 7,367,168 B2 * | 5/2008 | Lin ............ E04B 7/063 52/702 |
| 7,766,576 B2 | 8/2010 | Connell et al. |
| 7,788,873 B2 * | 9/2010 | Leek ............ E04B 1/2608 52/702 |
| 7,971,410 B2 | 7/2011 | Jerke |

(Continued)

*Primary Examiner* — Jeanette E Chapman
(74) *Attorney, Agent, or Firm* — Lando & Anastasi, LLP (57) ABSTRACT

A non-metallic joist hanger including a substantially U-shaped receiving channel defined by a pair of spaced apart side wall flanges and a base wall to receive a portion of a joist, an attachment flange extending transversely from each of the spaced apart side walls to attach to a transverse beam, and an arcuate bracing structure extending between each side wall and the adjacent attachment flange.

16 Claims, 6 Drawing Sheets

(56) References Cited

U.S. PATENT DOCUMENTS

| | | | | |
|---|---|---|---|---|
| 8,225,575 B2* | 7/2012 | Gadd | ................... | E04B 1/2608 |
| | | | | 52/289 |
| 8,250,827 B2* | 8/2012 | Lin | ...................... | E04B 1/2612 |
| | | | | 52/289 |
| 8,978,339 B2* | 3/2015 | Doupe | ...................... | E04B 1/38 |
| | | | | 52/702 |
| 9,347,213 B1 | 5/2016 | Zhang et al. | | |
| 9,637,911 B2* | 5/2017 | Doupe | ................. | E04B 1/2604 |
| 2002/0078656 A1 | 6/2002 | Leek et al. | | |
| 2004/0163355 A1 | 8/2004 | Collie | | |
| 2006/0150564 A1 | 7/2006 | Dufault | | |
| 2006/0191233 A1 | 8/2006 | Tamlyn | | |
| 2007/0145222 A1* | 6/2007 | Rausch | ................... | F16L 3/02 |
| | | | | 248/317 |
| 2007/0294979 A1 | 12/2007 | Lin et al. | | |
| 2013/0067850 A1* | 3/2013 | Sasanecki | ............. | E04B 1/2612 |
| | | | | 52/702 |
| 2016/0002912 A1 | 1/2016 | Doupe et al. | | |

* cited by examiner

NON-METALLIC JOIST HANGER

CROSS-REFERENCE TO RELATED APPLICATION

This patent application is a continuation-in-part patent application of U.S. patent application Ser. No. 14/790,637 filed on Jul. 2, 2015, entitled, "JOIST CONNECTOR," which claims priority under 35 U.S.C. §119(a)-(d) to Australian Patent Application No. AU 2014902579, filed on Jul. 4, 2014 and to Australian Patent Application No. AU 2016200576, filed on Jan. 29, 2016, all of which are incorporated by reference in its entirety for all purposes.

TECHNICAL FIELD

The present invention relates to a non-metallic joist hanger particularly to the connection of joists to bearers in a floor support structure.

BACKGROUND ART

In most decking situations, a deck built from the ground up contains stumps, bearers, joists and decking boards. It is common practice to bolt the bearers to the stumps and screw the decking boards to the joists. With regards to attaching the joists to the bearers, in some situations, the joists are "hung" inside the bearers using joist hangers. More commonly, the joists sit on top of and at 90 degrees to the bearers.

It is common practice to simply skew-nail the joists to the bearers. Whilst this is a legal practice, the skew-nailing is often a haphazard practice—as it is done at an angle to the joist and bearer, it is often debatable just how much of the joist is actually anchored to the bearer by the nails (the nails aren't too far up from the bottom of the joists). It is also common, especially with hardwood joists, to split the joist in the skew-nailing process—making the holding power minimal at best.

There are products such as metal "triple grips", and "uni-ties" available on the market which are frequently used to bolster the connection of the joist to the bearer. Such products work, however are very often only connected to one side of the joist to save time an the like (so often only do a partial job). They are also attached after the skew-nailing has already been completed, so is seen as a doubling up of labour.

The current practice is to use joist hangers which are folded or bent metal connectors. Due to the metal material used, the joist hangers are sufficiently strong to bear the load but the metal material is subject to deterioration in strength and integrity over time, even where the metal has been treated, such as by galvanising the metal.

It will be clearly understood that, if a prior art publication is referred to herein, this reference does not constitute an admission that the publication forms part of the common general knowledge in the art in Australia or in any other country.

SUMMARY OF INVENTION

The present invention is directed to a non-metallic joist hanger, which may at least partially overcome at least one of the abovementioned disadvantages or provide the consumer with a useful or commercial choice.

With the foregoing in view, the present invention in one form, resides broadly in a non-metallic joist hanger including a) a substantially U-shaped receiving channel defined by a pair of spaced apart side wall flanges and a base wall to receive a portion of a joist,
b) at least one attachment flange extending transversely from the spaced apart side walls to attach to a transverse beam, each of the sidewalls and attachment flange having a number of openings there through to receive elongate fasteners, and
c) at least one arcuate bracing structure extending between each side wall and the at least one attachment flange.

The joist connector of the present invention is typically used to connect a beam or other support extending in a first direction with a joist or similar elongate support extending in another direction without the need to skew nail or skew fix.

Normally, the joist hanger of the present invention will be located at the ends of the beam and/or joist.

The joist hanger of the present invention preferably has a one-piece construction. The joist hanger may be formed from any material but a plastic or similar material is preferred. A particularly preferred material is a polyamide such as Nylon 6 as this material is strong, tough and has a high degree of UV stability, especially once conditioned properly. Even more preferred is a glass filled plastic material particularly glass filled nylon for increased strength, stiffness, creep resistance and dimensional stability whilst retaining an excellent wear resistance.

It is particularly preferred that the joist hanger of the present invention be conditioned, especially if formed of a polyamide such as nylon 6. Preferably, active conditioning will be used in order to increase the strength of the material. Active conditioning preferably increases the flexibility and impact toughness of the material.

It is preferred that the joist connector of the present invention is formed by a moulding process.

The joist connector of the present invention includes a substantially U-shaped receiving channel defined by a pair of spaced apart side wall flanges and a base wall to receive a portion of a joist. The channel is typically adapted to receive an end portion of a joist.

The channel will typically be defined by a pair of spaced apart side wall flanges and a base wall. The pair of side wall flanges are typically parallel to one another. Each side wall flange is preferably planar. The side wall flanges are typically spaced from one another by a standard distance which corresponds to a standard or preferred width of a support beam. The side wall flanges typically receive a joist therebetween and the side wall flanges are then preferably attached directly to the joist.

Each of the side wall flanges may be the slightly resilient due in part to the material used but mainly due to the dimension (thickness) of the side wall flanges. The slight resilience preferably allows a small amount of deformation to occur in order to allow the channel to receive the joist. Typically, the joist will be received in a close fit with the internal surfaces of each of the side wall flanges abutting the sidewalls of the joist.

At least one, and typically a number of openings are provided in each of the side wall flanges in order to allow a fastener to be driven through an opening and into the joist. Typically the fasteners will be elongate fasteners such as screws or nails with an enlarged heads. In use, the elongate fasteners will typically be driven through the openings into the joist such that the head of the fasteners will abut the periphery or surround of the opening in the side wall flange to attach the joist hanger to the joist. Normally the elongate fasteners extend laterally into the joist.

The joist hanger of the present invention includes at least one attachment flange to attach to a transverse beam extending transversely from the spaced apart sidewall flanges. The at least one attachment flange functions as a face mount assembly and normally includes a pair of spaced apart flanges, one extending laterally outwardly from each of the sidewall flanges. The flanges of the face mount assembly will typically be substantially perpendicular to the channel but may be at an angle other than perpendicular if desired. As the name suggests, the face mount assembly is typically adapted to abut a beam or joist in order to mount the joist in the channel relative thereto in a face mount configuration.

The face mount assembly preferably includes a pair of spaced apart flanges. The pair of flanges are typically coplanar to one another. Each flange is preferably planar. The flanges are typically spaced from one another by a standard distance which corresponds to the width of the channel. The flanges are then preferably attached directly to a second beam or joist.

Each of the flanges may be slightly resilient due in part to the material used but mainly due to the dimension (thickness) of the flanges. The slight resilience preferably allows a small amount of deformation to occur in order to allow the face mount assembly to match any inconsistencies in external shape of the beam or joist to which the joist hanger is attached.

At least one, and typically a number of openings are provided in each of the flanges of the face mount assembly in order to allow a fastener to be driven through an opening and into the face of a beam or joist. Typically the fasteners will be elongate fasteners such as screws or nails with an enlarged heads. In use, the elongate fasteners will typically be driven through the openings into the beam or joist such that the head of the fasteners will abut the periphery or surround of the opening in the flange to attach the joist connector to the beam or joist. Normally the elongate fasteners extend laterally into the beam or joist.

There are normally a number of openings formed into each of the side wall flanges and the attachment flanges. Preferably, the openings provided have reinforced surrounds. The reinforced surrounds of each of the openings provided on the face mount flanges may have a different configuration to those provided on the side wall flanges.

Preferably, the reinforced surrounds of the openings provided on the side wall flanges have enlarged, button surrounds. The button surrounds normally have a substantially annular shape with the opening through the button surround, normally centrally. The button surround will normally be manufactured as a thickened portion which is generally approximately twice as thick as the thickness of the side wall flange.

The reinforced surrounds provided on the attachment flanges will preferably be bar surrounds. Each bar surrounds will typically be elongate preferably extending from the side wall flange (or bracing structure) laterally over the flange with an arcuate end portion. The opening through the bar surround will normally be through the arcuate end portion, and normally substantially centrally through the arcuate end portion. The reinforced bar surround provided on the attachment flanges may be of different lengths relative to the side wall flange in order to offset the openings through the attachment flange is from each other such that the openings are not provided in a column but are instead, spaced slightly laterally from one another in order to spread the load through the flange.

The reinforced surrounds may be solid portions of greater thickness than the flange relative to which the surrounds are provided or alternatively, may be hollow and be provided in a configuration of a raised portion extending above the level of the flange relative to which the surround is provided.

One or more arcuate bracing structures will typically be provided in order to brace each of the side wall flanges of the channel relative to the respective attachment flanges of the face mount assembly. Typically, the arcuate bracing structures are provided in order to brace the flanges in more than one direction or plane. The bracing structures will normally be substantially triangular shaped with one portion abutting one of the side wall flanges and a second portion abutting one of the attachment flanges or another bracing portion, preferably integrally formed therewith.

According to preferred embodiments, the bracing structure is preferably a partially spherical bracing structure. In other words, the bracing structure is normally arcuate in at least 2 directions or planes.

A bracing structure will normally be located between each side wall of the channel and the attachment flange immediately adjacent the sidewall of the channel. Normally, a bracing structure will be provided at an upper junction or corner. A bracing structure can be provided at a lower portion as well.

Normally, an arcuate bracing structure will be provided on both lateral sides of the channel. The arcuate bracing structure finishes substantially flush with the upper edge of the joist hanger and terminates approximately one third to one half down the height of the hanger from the upper edge.

A secondary bracing structure will also normally be provided at a lower portion of the joist hanger, normally extending substantially coplanar with the base wall of the channel between the sidewall of the channel and the adjacent attachment flange. The secondary bracing structure will normally brace in a single plane only.

Additional arcuate bracing structures may be provided between other planar walls or components of the joist hanger for example between the lower flange and the base wall, and/or between the side walls and the secondary bracing structure.

Single plane bracing typically only braces against force or load applied parallel to the plane of the bracing structure. The arcuate bracing structure provided according to the present invention functions as multi plane bracing which braces in multiple directions to resist deformation against force or load applied in multiple directions for example through twisting, with minimal material use and therefore, minimal weight increase. It has been found surprisingly that the provision of arcuate bracing structures rather than planar bracing structures substantially increases the strength of the joist hanger allowing the joist hanger to be manufactured from a plastic material which would not otherwise be capable of bearing the loads to which the joist hanger is subjected.

It has also been found surprisingly that the provision of arcuate bracing, that the vibration that is experienced when installing the fasteners is greatly reduced.

Preferably, one or more spacer ridges may be provided on the channel side of the base wall connecting the flanges. Normally a pair of spacer ridges is provided, each with a surface which is substantially coplanar in order to space the joist from the base wall. The spacer ridges are preferably parallel to one another, spaced apart and extend across the width of the base wall. One or more channels will typically be defined between the spacer ridges and this may allow drainage through the joist connector beneath the joist, limiting rot.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a non-metallic joist hanger 10 is provided.

The non-metallic joist hanger 10 illustrated in the accompanying Figures includes a substantially U-shaped receiving channel 11 defined by a pair of spaced apart side wall flanges 12 and a base wall 13 to receive a portion of a joist (not shown), an attachment flange 14 extending transversely from each of the spaced apart side walls 12 to attach to a transverse beam (not shown), and an arcuate bracing structure 15 extending between each side wall 12 and the adjacent attachment flange 14. Each of the side wall flanges 12 and attachment flanges 14 have a number of openings 16 therethrough to receive elongate fasteners, normally nails or screws, in order to attach the joist hanger 10 to the joist and the transverse beam.

The joist hanger of the illustrated embodiment is moulded as a one-piece construction made from plastic such as nylon 6.

As illustrated, the pair of side wall flanges 12 are parallel to one another and each side wall flange 12 is planar. The side wall flanges 12 are spaced from one another by a standard distance which corresponds to a standard or preferred width of a joist. The side wall flanges receive a joist therebetween and the side wall flanges are then preferably attached directly to the joist.

A number of openings 16 are provided in each of the side wall flanges 12 in order to allow a fastener to be driven through an opening 16 and into the joist. Typically the fasteners will be elongate fasteners such as screws or nails with an enlarged heads. In use, the elongate fasteners will typically be driven through the openings 16 into the joist such that the head of the fasteners will abut the periphery or surround of the opening 16 in the side wall flange 12 to attach the joist hanger 10 to the joist. Normally the elongate fasteners extend laterally into the joist, normally perpendicularly rather than skewed.

The attachment flanges 14 allows face mounting of the joist hanger 10 and as illustrated includes a pair of spaced apart attachment flanges 14, one extending laterally outwardly from each of the sidewall flanges and a lower flange 17 extending downwardly below the channel and formed integrally with the lateral attachment flanges 14. The attachment flanges 14 of the illustrated embodiment are substantially perpendicular to the channel 11.

The pair of attachment flanges 14 and lower flange 17 are coplanar with one another. Each lateral attachment flange 14 is planar and spaced from one another by a standard distance which corresponds to the width of the channel 11.

The openings 16 provided in each of the side wall flanges 12 and the attachment flanges 14 have reinforced surrounds. As illustrated, the reinforced surrounds of each of the openings 16 provided on the attachment flanges 14 have a different configuration to those provided on the side wall flanges 12.

The reinforced surrounds of the openings 16 provided on the side wall flanges 12 each have an enlarged, substantially circular shaped button surround 18. Each button surround 18 normally has a substantially annular shape with the opening 16 through the button surround, normally centrally. The button surround 18 is manufactured as a thickened portion which is generally approximately twice as thick as the thickness of the side wall flange 12.

In the illustrated embodiment, the reinforced surrounds provided on the attachment flanges 14 are bar surrounds. Each bar surround 19 is elongate, extending from the side wall flange 12 (or bracing structure) laterally over the flange 14 with an arcuate end portion. The opening 16 through the bar surround 19 is located substantially centrally through the arcuate end portion. The reinforced bar surrounds 19 provided on the attachment flanges 14 are of different lengths relative to the side wall flange 12 in order to offset the openings 16 through the attachment flanges 14 from each other such that the openings 16 are not provided in a column but are instead spaced slightly laterally from one another in order to spread the load through the flange 14.

Figure 1:
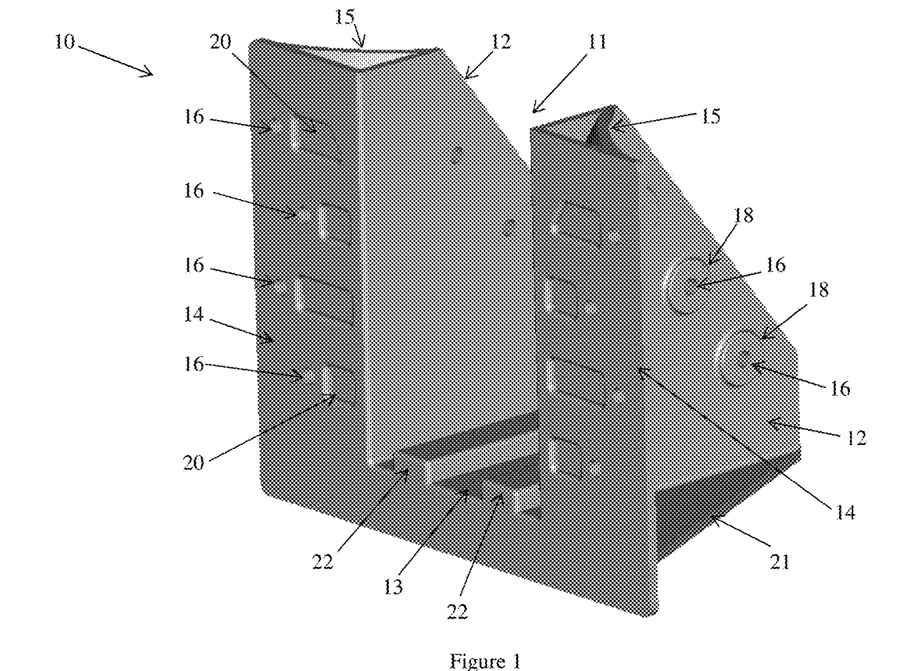
FIG. 1 is an isometric view from the attachment side of a non-metallic joist hanger according to a preferred embodiment of the present invention.
Figure 2:
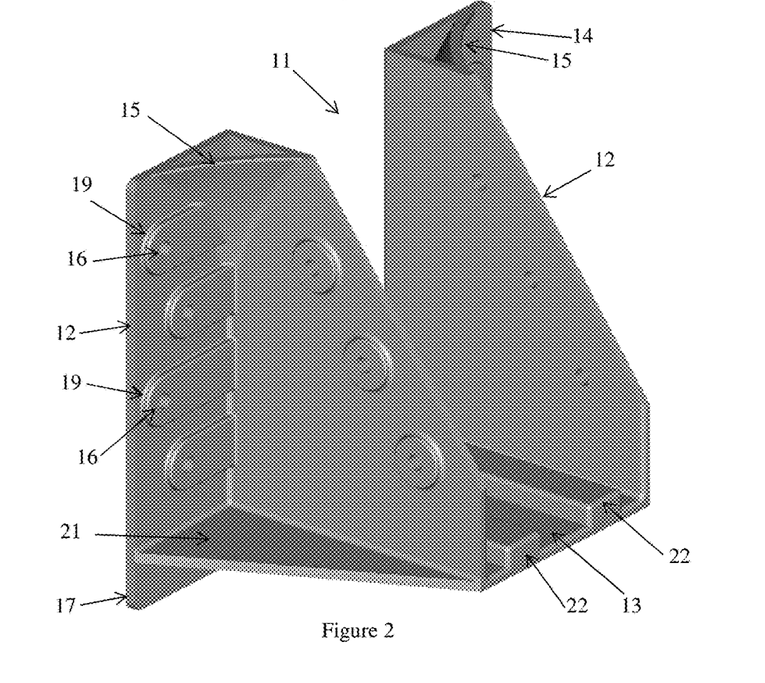
FIG. 2 is an isometric view from the joist side of a nonmetallic joist hanger as illustrated in FIG. 1.
Figure 3:
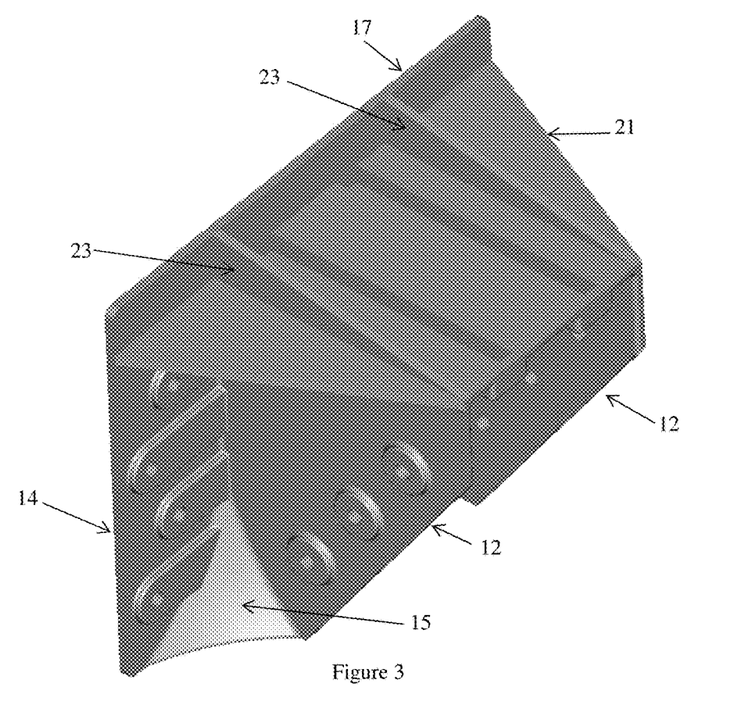
FIG. 3 is an isometric view from below of the joist hanger illustrated in FIG. 1.
Figure 4:
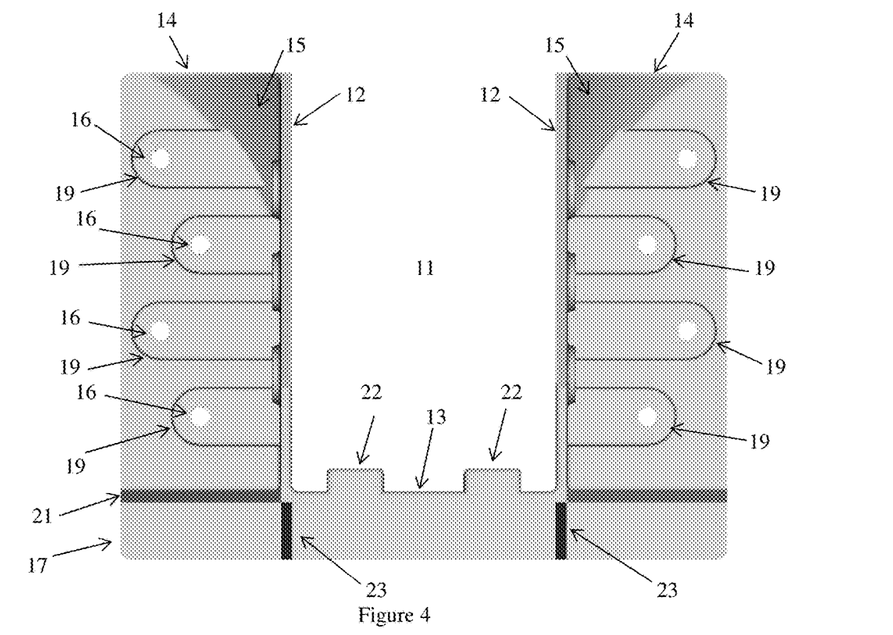
FIG. 4 is a front elevation view of the joist hanger illustrated in FIG. 1.
Figure 5:
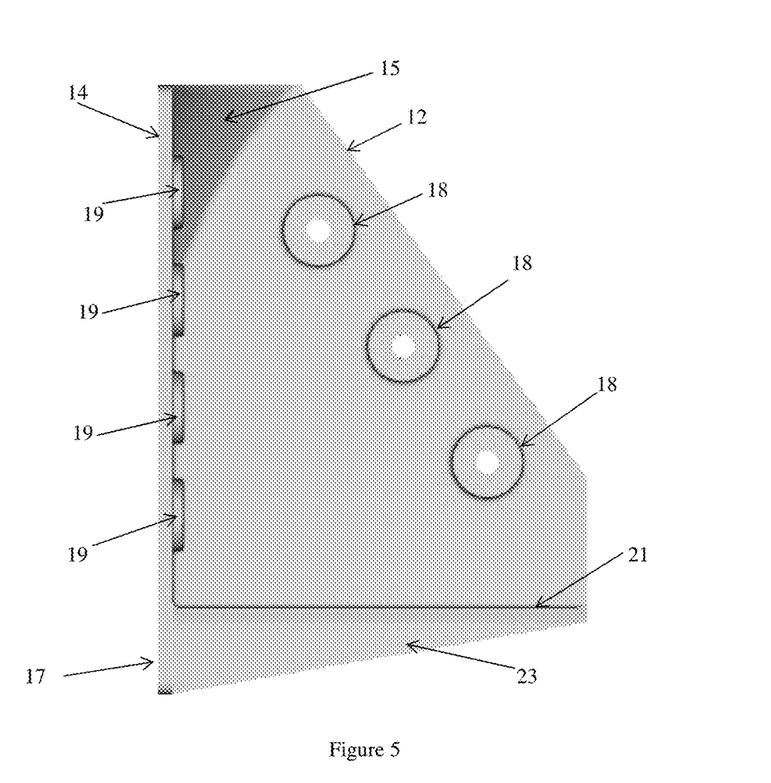
FIG. 5 is a side elevation view of the joist hanger illustrated in FIG. 1.
Figure 6:
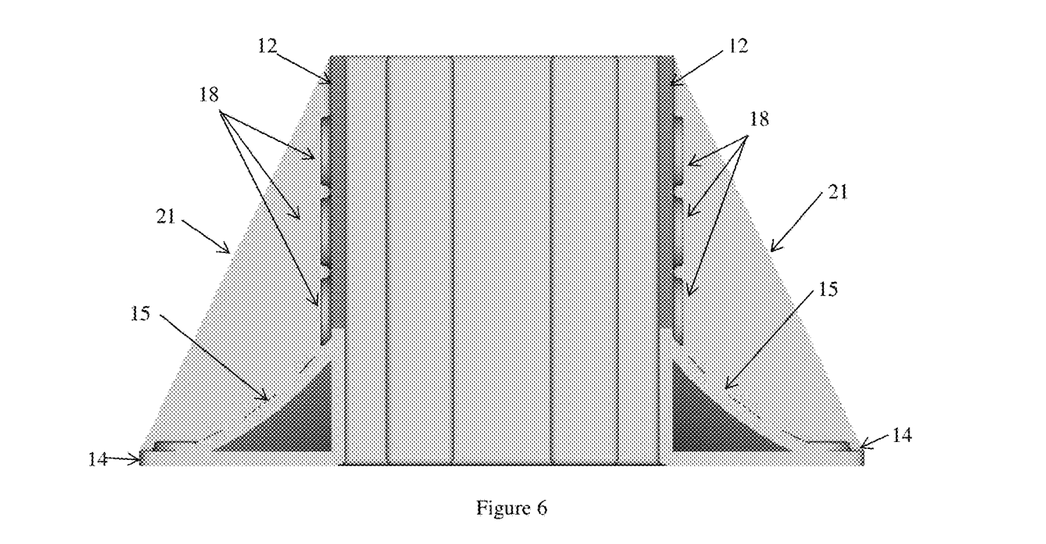
FIG. 6 is a view from below of the joist illustrated in FIG. 1.
Figure 7:
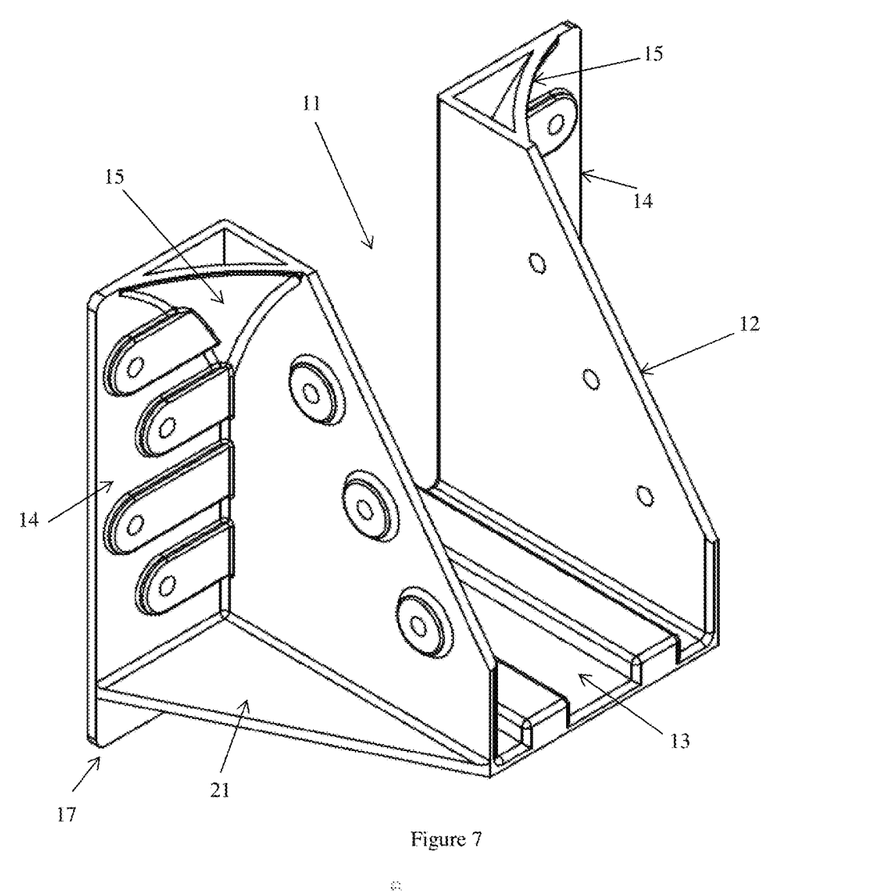
FIG. 7 is an isometric view from the joist side of a non-metallic joist hanger according to a preferred embodiment of the present invention.
Figure 8:
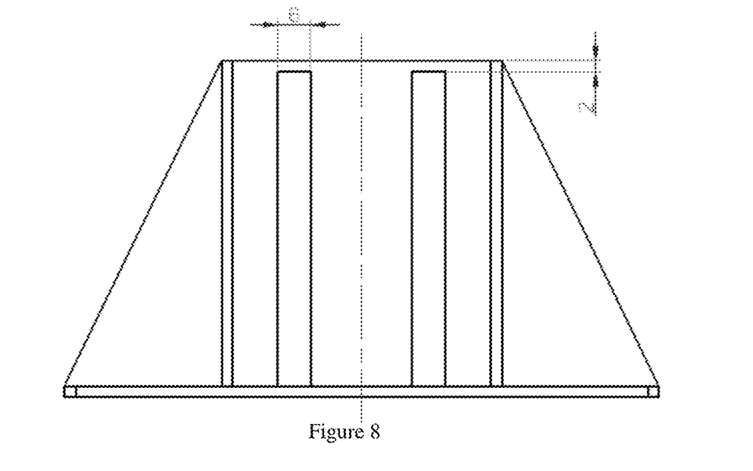
FIG. 8 is a bottom view of the joist hanger illustrated in FIG. 7.
Figure 9:
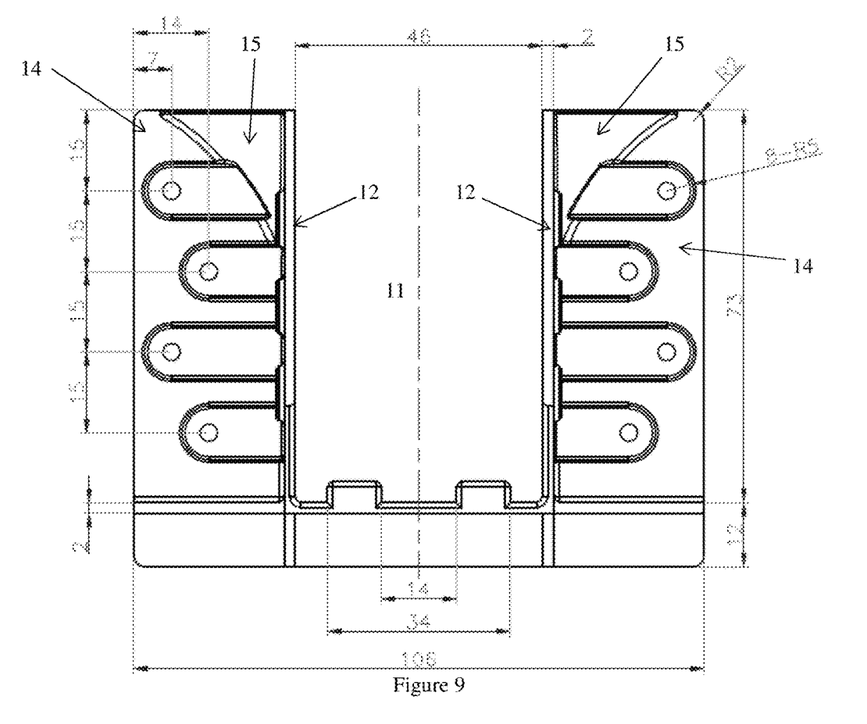
FIG. 9 is a front elevation view of the joist hanger illustrated in FIG. 7.
Figure 10:
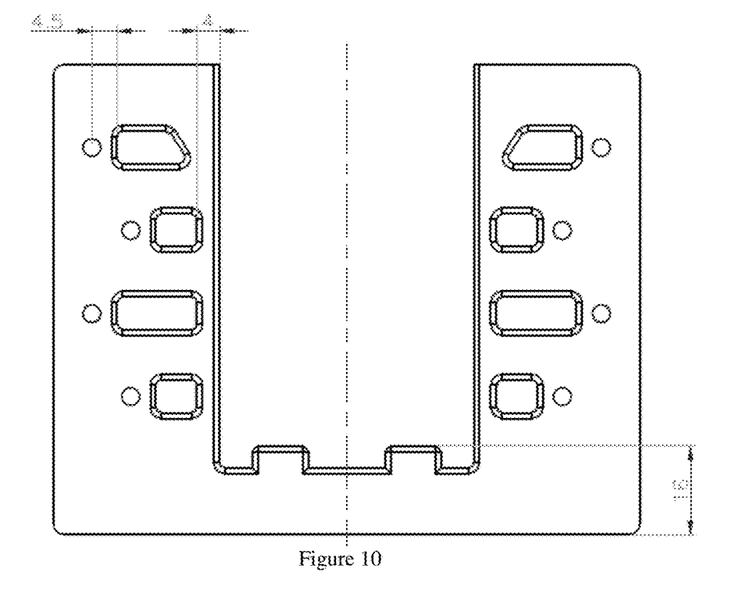
FIG. 10 is an elevation view from the beam side of the joist hanger illustrated in FIG. 7.
Figure 11:
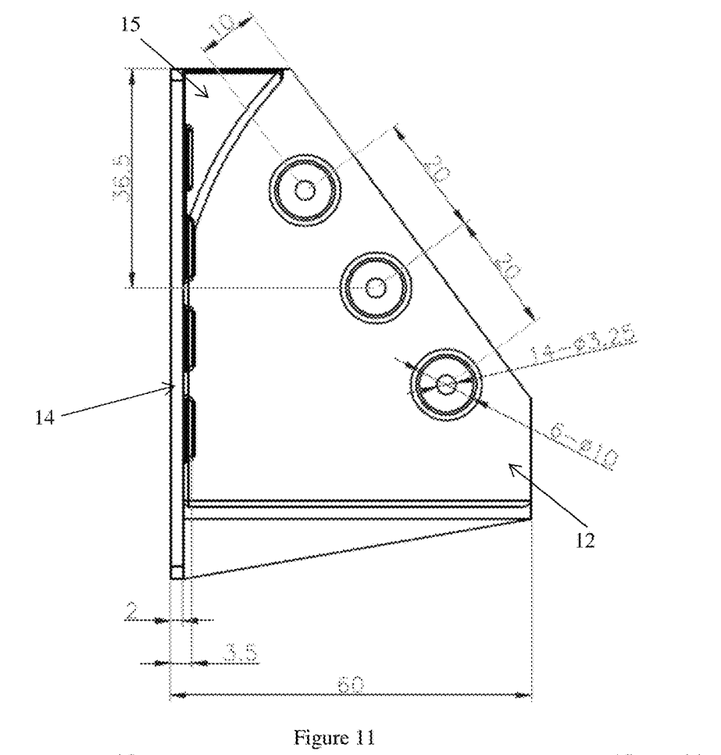
FIG. 11 is a side elevation view of the joist hanger illustrated in FIG. 7.
Figure 12:
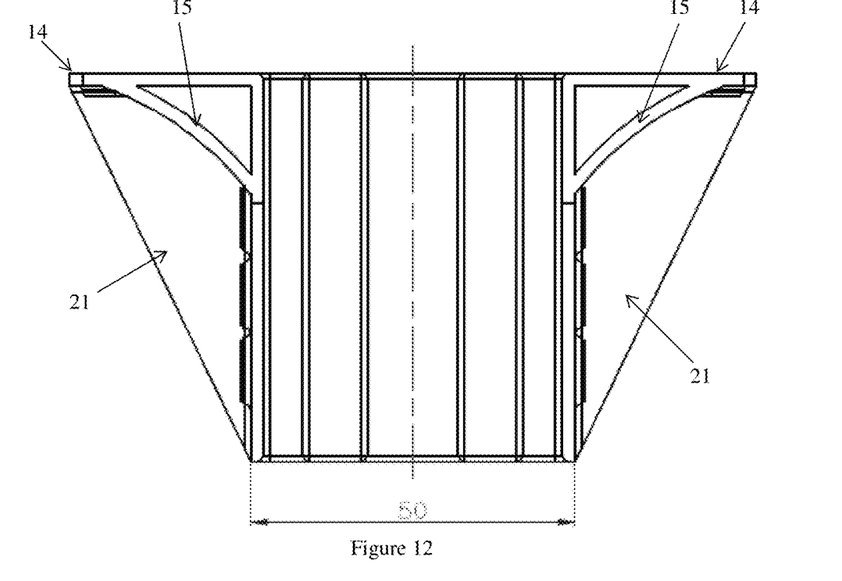
FIG. 12 is a plan view of the joist illustrated in FIG. 7.

The reinforced surrounds may be solid portions of greater thickness than the flange relative to which the surrounds are provided such as the button surrounds 18 provided on the side wall flanges 12 of the illustrated embodiment or alternatively, may be at least partially hollow and be provided in a configuration of a raised portion extending above the level of the flange relative to which the surround is provided such as the bar surrounds 19 provided on the attachment flanges 14 of the illustrated embodiment as best illustrated in FIG. 2 for example, having a cavity 20 at the rear.

An arcuate bracing structure 15 is provided in order to brace each of the side wall flanges 12 of the channel 11 relative to the respective attachment flange 14 of the face mount assembly. The arcuate bracing structures 15 provided, brace the flanges relative to one another in more than one direction or plane. The bracing structures will normally be substantially triangular shaped with one portion abutting one of the side wall flanges 12 and a second portion abutting the adjacent attachment flange 14.

As illustrated, each arcuate bracing structure 15 is a partially spherical bracing structure. In other words, the bracing structure is normally arcuate in at least 2 directions or planes.

Normally, an arcuate bracing structure 15 will be provided at an upper junction or corner between each side wall flange 12 and the adjacent attachment flange 14 on both lateral sides of the channel 11. The arcuate bracing structure 15 finishes substantially flush with the upper edge of the joist hanger and terminates approximately one third to one half down the height of the hanger 10 from the upper edge. Although illustrated as an arcuate wall which is not closed at an upper end, the upper end can be closed or open.

A secondary, planar bracing structure 21 is provided at a lower portion of the joist hanger 10, normally extending substantially coplanar with the base wall 13 of the channel 11 between the side wall 12 of the channel 11 and the adjacent attachment flange 14. The planar, secondary bracing structure 21 will normally brace in a single plane only. There is also a pair of planar bracing members 23 provided on an underside of base wall 13 to brace the lower flange 17. These underside bracing members taper in height from the lower flange 17 to the opposite end of the underside of the base wall 13.

A pair of spaced apart, spacer ridges 22 are provided on the channel side of the base wall 13. The upper surfaces of the respective spacer ridges 22 is substantially coplanar in order to space the joist from the base wall 13. The spacer ridges 22 are parallel to one another, spaced apart and extend across the width of the base wall. One or more channels will typically be defined between the spacer ridges and this may allow drainage through the joist connector beneath the joist, limiting rot.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A non-metallic joist hanger including
a) a substantially U-shaped receiving channel defined by a pair of spaced apart side wall flanges and a base wall to receive a portion of a joist,
b) at least one attachment flange extending transversely from the spaced apart side wall flanges to attach to a transverse beam, each of the side wall flanges and attachment flange having a number of openings there through to receive elongate fasteners,
c) at least one arcuate bracing structure extending between each side wall flange and the at least one attachment flange; and
d) at least one secondary bracing structure extending substantially coplanar with the base wall of the channel between the side wall flange of the channel and the adjacent at least one attachment flange.

2. A non-metallic joist hanger as claimed in claim 1 wherein a pair of arcuate bracing structures is provided, one on either side of the channel, each bracing structure being substantially triangular shaped with one portion abutting one of the side wall flanges and a second portion abutting one of the attachment flanges.

3. A non-metallic joist hanger as claimed in claim 2 wherein each bracing structure is located between the side wall flange of the channel and the attachment flange immediately adjacent the side wall flange of the channel.

4. A non-metallic joist hanger as claimed in claim 1 wherein an arcuate bracing structure is provided at an internal, upper corner between the side wall flange of the channel and the attachment flange immediately adjacent the side wall flange of the channel, and finishes substantially flush with an upper edge of the joist hanger and terminates between approximately one third to one half down a height of the hanger from the upper edge.

5. A non-metallic joist hanger as claimed in claim 1 wherein each bracing structure is partially spherical in shape, arcuate in at least 2 directions or planes.

6. A non-metallic joist hanger as claimed in claim 1 wherein a pair of spaced apart coplanar attachment flanges is provided.

7. A non-metallic joist hanger as claimed in claim 1 wherein a number of openings are formed into each of the side wall flanges and the at least one attachment flange through which fasteners are received to attach the non-metallic joist hanger to the joist and transverse beam.

8. A non-metallic joist hanger as claimed in claim 7 wherein at least some of the openings provided have reinforced surrounds.

9. A non-metallic joist hanger as claimed in claim 8 wherein, the reinforced surrounds of the openings provided on the side wall flanges have enlarged, button surrounds, substantially annular shape with the opening through the button surround.

10. A non-metallic joist hanger as claimed in claim 9 wherein the button surround is a thickened portion of material.

11. A non-metallic joist hanger as claimed in claim 1 wherein the at least one secondary bracing structure is planar.

12. A non-metallic joist hanger as claimed in claim 1 wherein one or more spacer ridges are provided on the base wall connecting the flanges configured to space the joist above the base wall.

13. A non-metallic joist hanger as claimed in claim 12 wherein a pair of spacer ridges are provided parallel to one another, spaced apart and extend across the width of the base wall.

14. A non-metallic joist hanger including
a) a substantially U-shaped receiving channel defined by a pair of spaced apart side wall flanges and a base wall to receive a portion of a joist, b) at least one attachment flange extending transversely from the spaced apart side wall flanges to attach to a transverse beam, each of the side wall flanges and attachment flange having a number of openings there through to receive elongate fasteners, and c) at least one arcuate bracing structure extending between each side wall flange and the at least one attachment flange, wherein a number of openings are formed into each of the side wall flanges and the at least one attachment flange through which fasteners are received to attach the non-metallic joist hanger to the joist and transverse beam, wherein at least some of the openings provided have reinforced surrounds, and wherein, the reinforced surrounds of the openings provided on the at least one attachment flange have raised bar surround, each bar surround being elongate extending from the side wall flange laterally over the at least one attachment flange with an arcuate end portion having the opening therethrough.

15. A non-metallic joist hanger as claimed in claim 14 wherein, the reinforced bar surrounds provided on the attachment flanges are of different lengths relative to the side wall flange in order to offset the openings through each attachment flange from each other opening in the attachment flange.

16. A non-metallic joist hanger as claimed in claim 14 wherein the raised bar surrounds are each a hollow, raised portion extending above the level of the attachment flange relative to which the bar surround is provided.

\* \* \* \* \*